US012608012B2

(12) United States Patent
Haghighipanah et al.

(10) Patent No.: US 12,608,012 B2
(45) Date of Patent: Apr. 21, 2026

(54) SYSTEM AND METHOD FOR AUTONOMOUS MOBILE ROBOT RELOCALIZATION

(71) Applicant: Intel Corporation, Santa Clara, CA (US)

(72) Inventors: Mohammad Haghighipanah, Tigard, OR (US); Rita Chattopadhyay, Chandler, AZ (US)

( * ) Notice: Subject to any disclaimer, the term of this patent is extended or adjusted under 35 U.S.C. 154(b) by 147 days.

(21) Appl. No.: 18/398,737

(22) Filed: Dec. 28, 2023

(65) Prior Publication Data

US 2025/0216849 A1 Jul. 3, 2025

(51) Int. Cl.
| | |
|---|---|
| *G05D 1/24* | (2024.01) |
| *G05D 1/221* | (2024.01) |
| *G05D 1/646* | (2024.01) |
| *G05D 1/80* | (2024.01) |
| *G06F 18/2413* | (2023.01) |
| *G06N 7/01* | (2023.01) |

(52) U.S. Cl.
CPC .............. *G05D 1/24* (2024.01); *G05D 1/221* (2024.01); *G05D 1/646* (2024.01); *G05D 1/80* (2024.01); *G06F 18/24147* (2023.01); *G06N 7/01* (2023.01)

(58) Field of Classification Search
CPC G05D 1/24; G05D 1/80; G05D 1/221; G05D 1/646; G06F 18/24147; G06N 7/01
See application file for complete search history.

(56) References Cited

U.S. PATENT DOCUMENTS

| | | | |
|---|---|---|---|
| 11,348,269 B1* | 5/2022 | Ebrahimi Afrouzi ... | G01S 17/48 |
| 2022/0026920 A1* | 1/2022 | Ebrahimi Afrouzi ...... | |
| | | | G06N 3/0495 |
| 2022/0307849 A1* | 9/2022 | Chattopadhyay .. | G01C 21/3453 |

* cited by examiner

*Primary Examiner* — Hitesh Patel
*Assistant Examiner* — Izcalli Rios-Aguirre
(74) *Attorney, Agent, or Firm* — Banner & Witcoff, Ltd.

(57) ABSTRACT

Various aspects of methods, systems, and use cases include techniques for robotic relocalization. A robot may be configured to perform relocalization using operations to determine a cause of a loss of pose; use a nearest neighbor process to select a set of milestones from a roadmap when the cause of the loss of pose is due to a malfunction, or use a ranking process to select the set of milestones from the roadmap when the cause of the loss of pose is not due to the malfunction, the roadmap including a plurality of milestones; generate particle clouds around each milestone in the set of milestones; and perform localization on each milestone in the set of milestones to attempt to relocalize the robot.

19 Claims, 7 Drawing Sheets

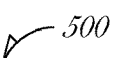

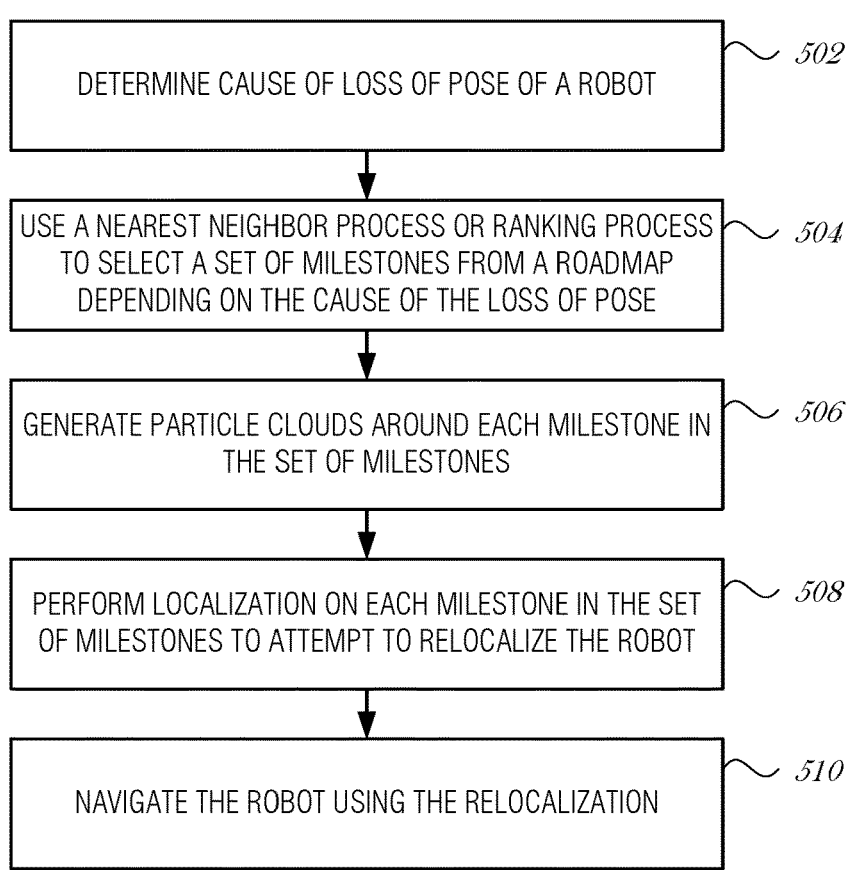

DETERMINE CAUSE OF LOSS OF POSE OF A ROBOT ~ 502

USE A NEAREST NEIGHBOR PROCESS OR RANKING PROCESS TO SELECT A SET OF MILESTONES FROM A ROADMAP DEPENDING ON THE CAUSE OF THE LOSS OF POSE ~ 504

GENERATE PARTICLE CLOUDS AROUND EACH MILESTONE IN THE SET OF MILESTONES ~ 506

PERFORM LOCALIZATION ON EACH MILESTONE IN THE SET OF MILESTONES TO ATTEMPT TO RELOCALIZE THE ROBOT ~ 508

NAVIGATE THE ROBOT USING THE RELOCALIZATION ~ 510

COMPUTE NODE

COMPUTE CIRCUITRY

*604*

*606*

*602*

PROCESSOR    MEMORY

*608*

I/O SUBSYSTEM

*610*

DATA STORAGE

*614*

PERIPHERAL DEVICE(S)

COMM. CIRCUITRY SUBSYSTEM

*612*

NIC

*620*

SYSTEM AND METHOD FOR AUTONOMOUS MOBILE ROBOT RELOCALIZATION

BACKGROUND

Robots may be programmed to complete complex tasks in an environment. Robots use various mechanisms to navigate throughout the environment and maintain its pose (position or location) within the environment. Depending on the design, sophistication, and purpose of the robot, it may employ one or more sensors such as image capture devices (e.g., an RGB camera, an infrared camera, etc.), ranging devices (e.g., radar, lidar, sonar, etc.), proximity sensors, or the like to navigate within the environment.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 is a flowchart illustrating a relocalization technique, according to an example;

DETAILED DESCRIPTION

Figure 1:
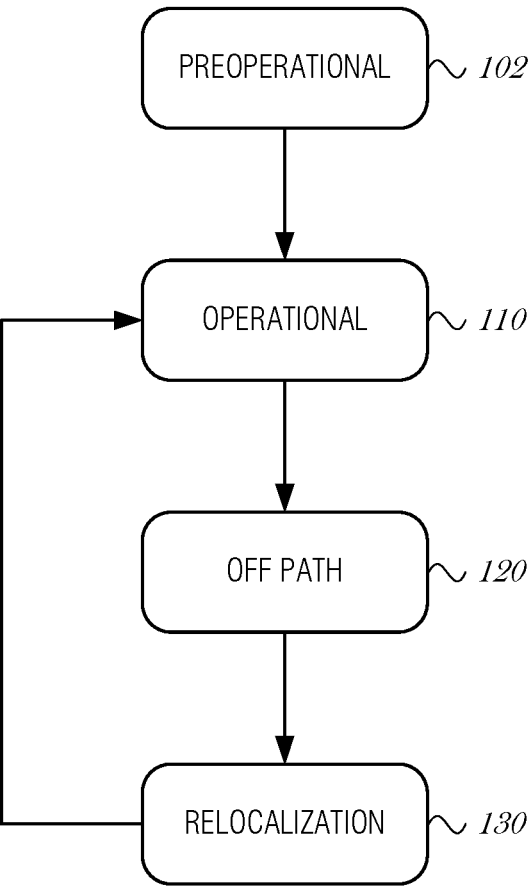
FIG. 1 is a diagram illustrating a general relocalization technique, according to an example.

In the following description, for purposes of explanation, numerous specific details are set forth in order to provide a thorough understanding of some example embodiments. It will be evident, however, to one skilled in the art that the present disclosure may be practiced without these specific details.

The systems and methods described herein may be used to relocate a robot or other autonomous agent (e.g., vehicle, machine, droid, etc.) that has lost its pose. Pose refers to the robot's location and/or orientation in an environment or position on a map. A robot may lose its pose due to many causes, such as a malfunctioning sensor, corrupted data, a hardware or software fault, an operating system error, or by being "kidnapped" by being moved by an external force (e.g., a person who picks up and moves the robot). Once the robot loses its ability to determine its current location in a map that it was using or in a known environment that it was mapping, the robot has to rely on current sensor readings and attempt to determine its location based on searching the map or previous sensor readings. If the robot finds a match, then the robot can relocalize itself. Relocalization is the process of determining its current location and orientation. Relocalization may be performed by the robot or by a robot controller (e.g., a system that remotely controls one or more robots).

Relocalization algorithms are important for robot navigation. The relocalization can be divided in two different categories depending on whether the robot is equipped with a laser scanner, a camera module, or both. If the robot is equipped with a laser scanner, then conventional approaches use a Monte Carlo Localization (MCL) algorithm for relocalization. While this technique is well studied and can solve the relocalization problem in most scenarios, the MCL algorithm is heavily compute intensive. As such, robots would require higher-performing compute hardware to perform this algorithm. The present systems and methods use an improved approach that is more efficient and conserves compute time, battery, memory, and other resources.

If the robot is equipped with only a camera module, then conventional approaches may use a bag of words (BoW) technique for relocalization. The BoW technique is less accurate than other approaches. The BoW relocalization can provide an estimate of the robot pose, however, an additional optimization technique is needed to improve accuracy.

In scenarios where both a camera module and a laser scanner are available, then conventional approaches use a vision approach to find the estimated pose and further optimize the pose by laser scans. However, there is a need for a compute-efficient technique to better utilize laser scans when performing pose estimation.

The present system and methods address the relocalization problem by using laser scans to provide an accurate pose estimation with improved compute time and memory. Using the systems and methods described herein, autonomous vehicles, autonomous mobile robots, and drones have a fast, reliable relocalization solution for a safe navigation. Further, the techniques explained in this document can be used for a vision-based approach by reducing the vision space search space, as described further below. Additional details are provided below.

FIG. 1 is a diagram illustrating a general relocalization technique, according to an example. In preoperational state 100, an autonomous mobile robot (AMR) is configured for operation. Configuring the AMR may include activities such as installing or initializing sensors, operating systems, runtime libraries, executables, programmable hardware, engines, batteries, locomotion mechanisms, and the like. For instance, an AMR for cleaning may be configured with a map of the environment it is designed to clean and one or more paths to use when traversing through the environment.

In operational state 110, the AMR is operated in an environment according to its use. For example, the cleaning AMR may operate to empty trash bins of offices on the floors of an environment. The AMR may be operable to move from office to office, sense walls, doors, trash bins, and other objects in the environment while it traverses one or paths configured by preoperational state 100. The cleaning AMR may include sensors (e.g., lidar, radar, cameras, GPS, indoor positioning systems, microphones, etc.) to determine its location and orientation in the map and sense potential obstacles, stairs, or other objects in the environment. During the operational state 110, the AMR may perform various other techniques including Simultaneous Localization and Mapping (SLAM) operations, alternative mapping operations, building models of its environment, tracking its location in space for navigation and positional monitoring, recording images, video, or audio, and the like. Data collected may be stored in case the AMR has to relocate itself.

In off path state 120, the AMR has lost its position. There are two main reasons why an AMR may lose its position: malfunction or external forces. An AMR may lose its position due to a malfunction of one or more of its systems.

For instance, a sensor array may malfunction, which results in the AMR traversing to an area in an environment that was off path. An AMR may also lose its position by external forces. For instance, a person may disable the AMR, pick it up and move it to another location, and then reenable the AMR. This is referred to as a kidnapping scenario. In either case, the AMR now has to relocate itself to be able to get back on path.

In relocalization state 130, the AMR uses data that it has previously sensed, data that is currently being sensed, or data obtained by the AMR (e.g., over a wireless connection with a cloud service). The AMR may use a relocalization technique to identify its pose (location and orientation) in an environment (e.g., on a map).

One conventional technique used for relocalization is Adaptive Monte Carlo Localization (AMCL). AMCL uses a particle filter and works by utilizing laser scanning. A particle is a location in a map (e.g., an x-y coordinate) that may be a possible pose (location and orientation) of the AMR. For relocalization, AMCL randomly generates particles throughout the entire map. As the AMR moves and gathers more information from the environment, the particle weights get updated, and the AMCL converges by improving the uncertainty of a particle that represents the most likely pose.

Although AMCL can provide accurate localization estimates and is robust to sensor noise, due to the nature of MCL and the number of particles, it is compute intensive and requires a large convergence time. Further, AMCL requires high amounts of memory because the state of each particle needs to be stored.

Another technique that was conventionally used for relocalization is referred to as a Strategy to Find a Missing Person (SFMP). SFMP uses MCL and limits the number of particles generated in proximity of where the AMR was last localized. SFMP constructs a moving distance map to denote the displacement from the last known location point to reduce the search space.

The disadvantage of SFMP is that the relocalization approach works better if the last known location of the AMR is known. Because of the reliance on the last known location in its algorithm, SFMP does not provide any advantage for an initial relocalization on power up/activation, or when a robot is kidnapped (e.g., picking up the robot and placing it in a new environment). Also, as the elapsed time increases, the efficiency of this method decreases because a larger environment is needed to conduct the search.

The relocalization technique described herein has advantages over both AMCL and SFMP. The search environment is reduced by constructing a path from a plurality of milestones, the path having segments linked by milestones on the path (i.e., waypoints) and ranking the milestones of interest based on a connectivity value. The search is then conducted iteratively over subsets of the ranked milestones. The milestones are selected, grouped, and ranked differently depending on the reason why the AMR lost its position. These implementations are discussed further below.

For each subset, particle clouds are generated around the milestones. A particle is a possible pose or position of the robot. The particle clouds may be generated using a random sampling technique, such as with a Gaussian distribution. The number of particles generated at each milestone may be the same, different, adapted (e.g., based on a function), or configurable. A Monte Carlo Localization (MCL) or another localization technique is used on the selected milestones with the particle cloud that was generated. The number of milestones or the number of particles may be increased to increase the search space until a solution is found.

Figure 2:
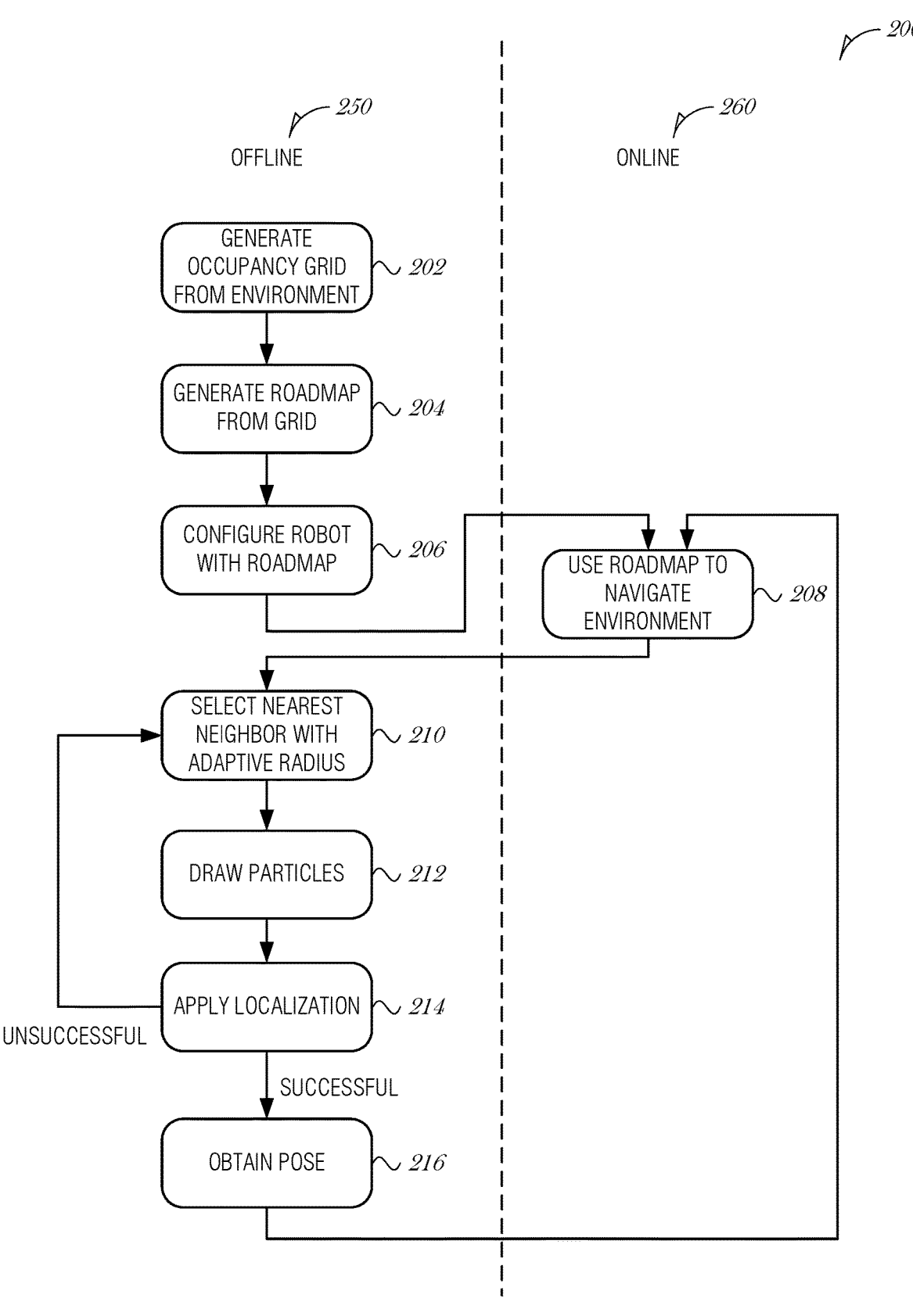
FIG. 2 is a flowchart illustrating a relocalization technique, according to an example.

FIG. 2 is a flowchart illustrating a relocalization technique 200, according to an example. The relocalization technique 200 described in FIG. 2 is for the situation where the localization failure is due to malfunction. As discussed above, malfunctions of sensors, software, hardware, communications, or other components may cause a localization failure at the AMR.

At operation 202, in an offline phase 250, a grid map is generated. The grid map may be an occupancy grid map and be based on the operating environment of an AMR. Using sensor data from one or more AMRs in the operating environment, together with other information about the environment that is already known (e.g. data regarding the size and location of static objects in the environment), a shared environment model that represents the environment is generated. This shared environment model may be represented as a navigation grid (occupancy grid) having cells of any suitable size and/or shape, with each cell having specific properties with respect to the type of object contained (or not contained) in the cell, whether an object in the cell is static or moving, etc., which enables the environment model to accurately depict the state of the environment.

As an example, grid cells may be squares of predetermined sizes (e.g., 80 mm) based upon a desired granularity for a particular environment and accompanying application. The environment model may thus be dynamically updated by AMRs directly on a cell-by-cell basis as new sensor data is received from the AMRs. The updates to the shared environment model thus reflect any recent changes in the environment such as the position and orientation of AMRs and other obstacles that may change in a dynamic manner within the environment (e.g. people, forklifts, machinery, etc.). The shared environment model may additionally or alternatively be updated based upon data received from other sensors or devices within the environment, such as stationary cameras for example, which may enable a more accurate depiction of the positions of obstacles and AMRs without relying on AMR communications.

At operation 204, the grid map of the AMR's environment is transformed into Probabilistic Roadmap or a Deterministic Roadmap (PRM/DRM). The number of milestones needed to construct a PRM/DRM may be chosen or intelligently determined based on heuristics. In an example, Adaptive Sampling techniques based on Intelligent Sampling and Two-way search (ITS) are used to determine the number of milestones.

At operation 206, the AMR is configured using the PRM/DRM generated from operation 204. The AMR may be configured to use some or all of the PRM/DRM during its operation. Either a PRM or a DRM works for the operations described herein.

At operation 208, the AMR is brought online (online phase 260) and uses the roadmap to navigate the environment. This is considered normal operational mode where the AMR uses the roadmap to move from location to location depending on tasks and objectives. At some point, the AMR suffers a malfunction of sensors, software, hardware, communications, or other components causing a localization failure and AMR loses its pose.

At operation 210, the last known location of the AMR is determined and a top N closest milestones are identified from the map based on a Nearest Neighbor (NN) search from the last known location. The AMR is in an offline phase 250. The NN search is a technique to find the closest data points to a given query point in a high-dimensional space. The NN search uses a search radius around a milestone to determine if any other milestones are within the radius. The number of milestones returned may be capped to some number, N, as the maximum milestones for a given iteration of the NN search.

Various types of NN search may be used. A non-limiting list includes using Linear Search, k-d Tree Search, Vector Approximation Files, Compression/Clustering-based search, Quadtree and Octree Search, Orchard's Algorithm and Annulus Algorithm, Principal Component Partitioning (PCP), R-Tree Search, dynamic search, vp tree search, bk tree search, and Locality sensitive hashing search.

The milestones selections are prioritized based on a path or intended trajectory. The path includes a source milestone, a goal milestone, and zero or more intermediate milestones between the source and goal milestones. Milestones that are part of the path may also be referred to as waypoints. In an example, each of the milestones in the path are included in the top N closest milestones along with milestones that are identified with the NN search.

At operation 212, particle clouds are generated around the top N selected milestones based on a Gaussian distribution. At operation 214, a localization technique (e.g., Monte Carlo Localization) is used on these N selected milestones.

If the solution is not found, then the technique 200 returns to operation 210 to select a next set of N ranked milestones from the PRM/DRM roadmap. The search is expanded by selecting the next N milestones found by increasing the radius used in the NN search. Additionally, the number of the particles are changed adaptively based on Equation 1, until a solution is found.

$$S = \min(\Delta t \times v + p_{min}, \, p_{max}) \qquad \text{Equation 1}$$

where, $\Delta t$ is time elapsed since localization failed, $v$ is robot speed, $p_{min}$ is minimum number of particles, and $p_{max}$ is the maximum number of particles allowed.

If a solution is found, then the localization technique is successful and a pose is determined (operation 216), the AMR is able to return to normal operation and be brough back online (operation 208).

Figure 3:
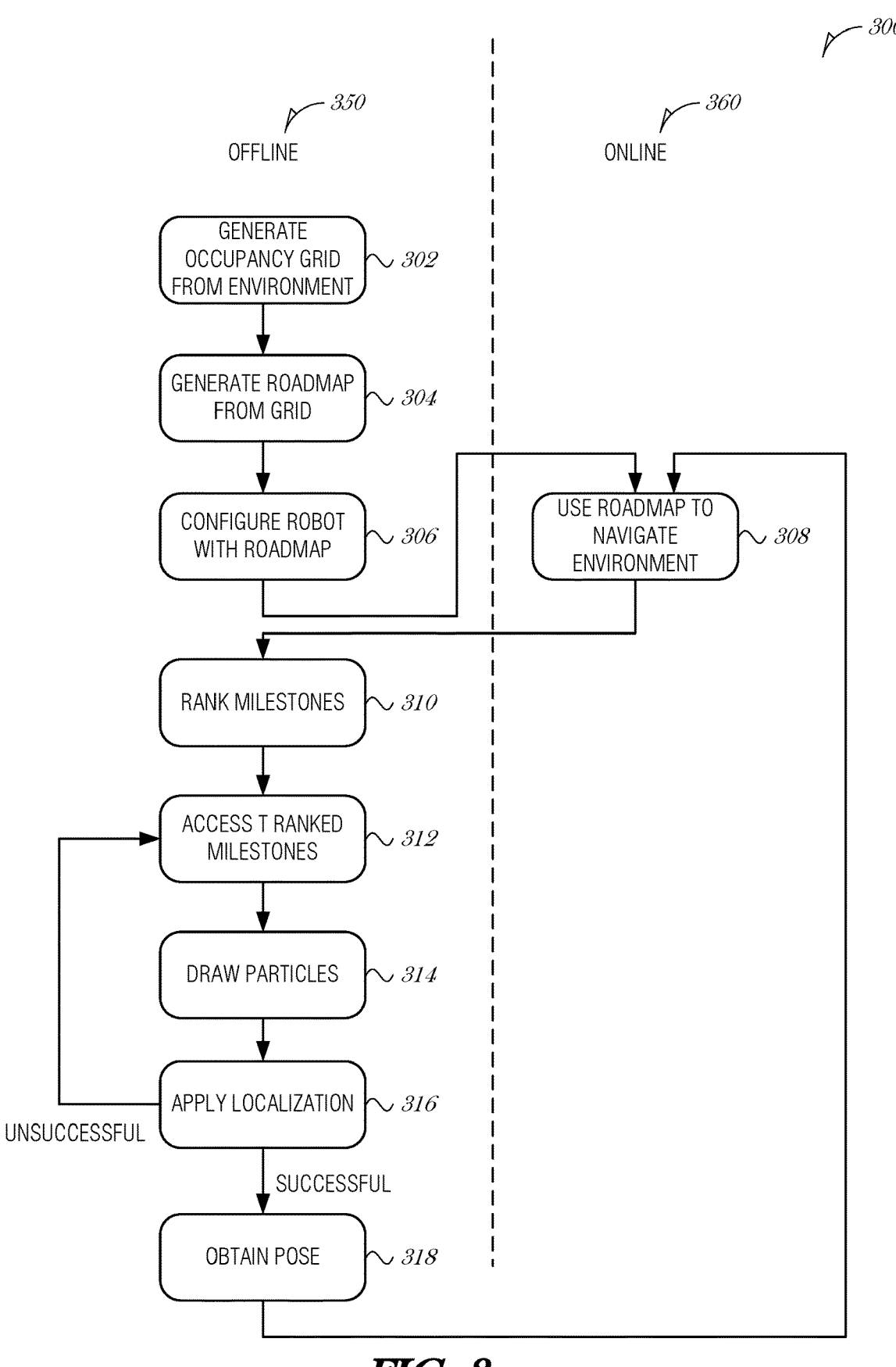
FIG. 3 is a flowchart illustrating a relocalization technique, according to an example.

FIG. 3 is a flowchart illustrating a relocalization technique 300, according to an example. The relocalization technique 300 described in FIG. 3 is for the situation where the localization failure is due to external forces. As discussed above, external forces may include situations where a person picks up and moves a robot, when a robot is moved by an animal, another robot, or by an act of nature (e.g., earthquake), or similar situations.

At operation 302, in an offline phase 350, a grid map is generated. The grid map may be an occupancy grid map and be based on the operating environment of an AMR, as discussed above in operation 202.

At operation 304, a grid map is converted into a Probabilistic or Deterministic Roadmap (PRM/DRM). A grid map may be converted to either a Probabilistic Roadmap (PRM) or a Deterministic Roadmap (DRM). In a PRM the milestones are generated randomly and in a DRM the milestones are generated deterministically. Either a PRM or a DRM works for the operations described herein.

The number of milestones needed to construct a PRM/DRM may be chosen or intelligently determined based on heuristics. In an example, Adaptive Sampling techniques based on Intelligent Sampling and Two-way search (ITS) are used to determine the number of milestones.

At operation 306, the AMR is configured using the PRM/DRM generated from operation 304. The AMR may be configured to use some or all of the PRM/DRM during its operation. Either a PRM or a DRM works for the operations described herein.

At operation 308, the AMR is brought online (online phase 360) and uses the roadmap to navigate the environment. This is considered normal operational mode where the AMR uses the roadmap to move from location to location depending on tasks and objectives. At some point, the AMR suffers a malfunction of sensors, software, hardware, communications, or other components causing a localization failure and AMR loses its pose.

At operation 310, the milestones are ranked based on the number of the connectivity value. The connectivity value refers to the number of edges connecting to the milestone in the PRM/DRM. In addition to the number of connections to a milestone (connectivity), milestones may also be ranked based on historical data. For instance, milestones that are traversed more often or used more often in path planning are weighted higher than other milestones.

An example formula for determining a ranking value is: Ranking Value (R)=Connectivity Value (C)+Historical Visits (V), where C is the number of connections to a given milestone, and V is the number of visits the robot has made to the given milestone in some period. The period may be configurable but may be in terms of hours, days, weeks, etc.

For example, if a milestone is connected to three adjacent milestones, then this milestone has a rank of three. As another example, the connectivity may be calculated based on a different linear formula, polynomial formula, or other formula.

As another example, historical data may be used in the ranking formula. Milestones are ranked based on the number of times the robot has visited a milestone or an area where the milestone is located. One example is to keep track of how many times a robot has reached each milestone historically. As another example, in a warehouse with two different rooms (room 1 and room 2), and based on historical data over the last two weeks, it is determined that the robot has been in room 1, five times and it has been in room 2, twenty times. Thus, any milestones in room 2 are ranked twenty and any milestones in room 1 are ranked five.

At operation 312, the highest T ranked milestones are selected from the PRM/DRM map. At operation 314, particle clouds are generated around the T selected milestones base on a Gaussian distribution. At operation 316, a localization technique (e.g., Monte Carlo Localization) is used on these T selected milestones.

If the solution is not found, then the technique 300 returns to operation 308 to select a next set of T ranked milestones from the PRM/DRM map. The number of the particles to generate around each of the milestones is adaptively changed based on Equation 2.

$$S = \min\left(T \times N \times \frac{2\pi}{\Delta}, \, p_{max}\right) \qquad \text{Equation 2}$$

where, S is the number of particles needed to draw for MCL, T is the number of selected top rank milestones, N is the number of nearest neighbor milestones (connectivity number) for each selected milestone, A is the desired step size for rotation in radian, $p_{max}$ is the maximum number of particles allowed. The last argument controls how many particles are allowed per radian around a given milestone. In other words, the distribution of particles around a milestone per angle.

If a solution is found, then the localization technique is successful and a pose is determined (operation 318), the AMR is able to return to normal operation and be brough back online (operation 308).

Figure 4:
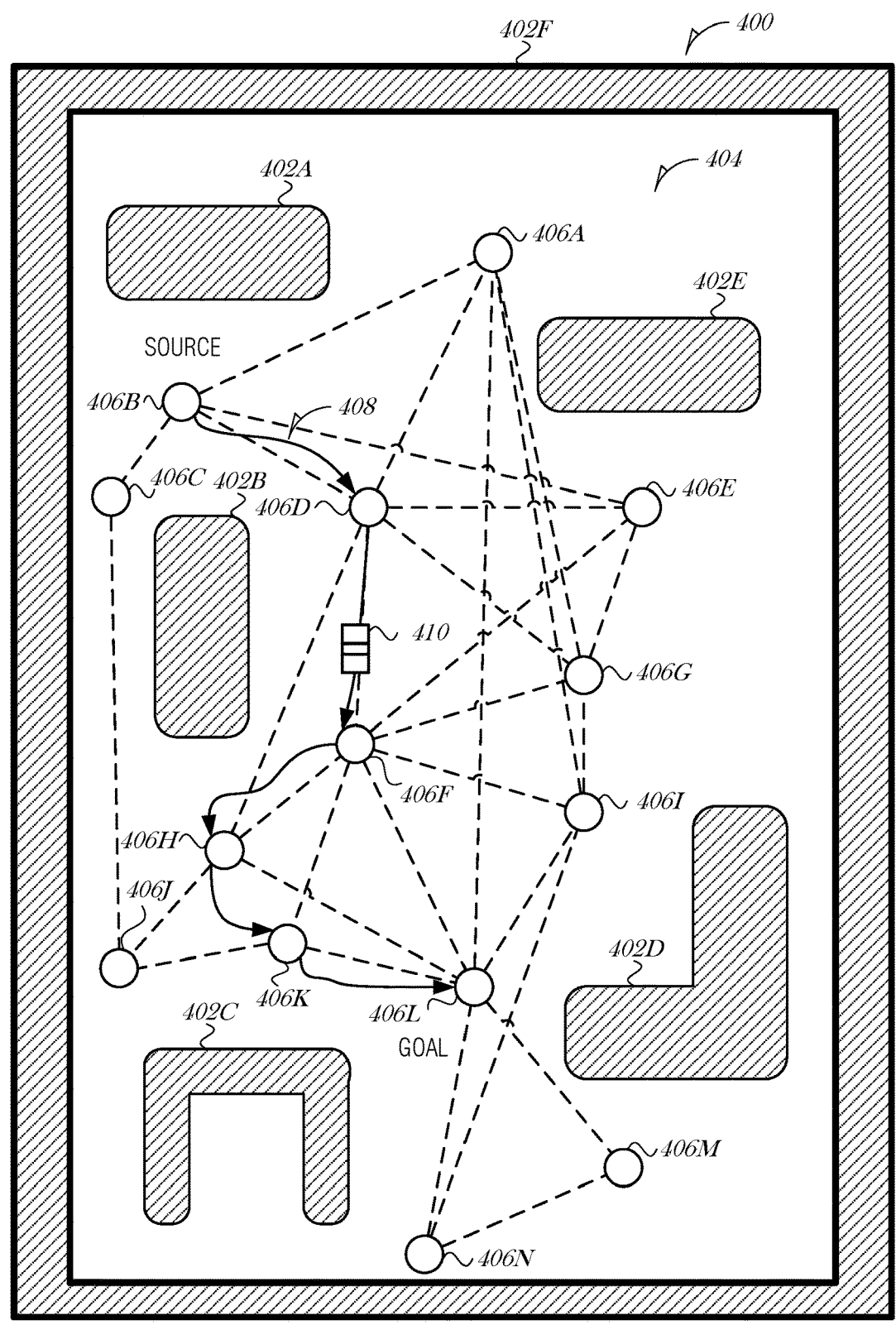
FIG. 4 is a diagram illustrating an environment for a use case, according to an example.

FIG. 4 is a diagram illustrating a roadmap 400 of an environment for a use case. The roadmap 400 may be a PRM or DRM. The roadmap 400 includes occupied spaces 402A-F and unoccupied space 404. A number of milestones 406A-N are distributed throughout the unoccupied space 404. A path 408 is made up of two or more milestones 406A-N. The path 408 includes milestones 406B, 406D, 406F, 406H, 406K, and 406L. A robot 410 navigates from a source milestone 406B to a goal milestone 406L.

In a first scenario, the robot 410 temporarily loses its sensing ability while navigating from milestone 406D to milestone 406F. Technique 200 may be used in this situation. The last known position is identified as milestone 406D. A top N closest milestones are identified using a Nearest Neighbor search. For instance, milestones 406A, 406B, 406E and 406G may be identified with the NN search. Particle clouds are generated around these milestones and the MCL is used. If no solution is found, then the search is expanded by adjusting the NN search and the number of particles are increased using Equation 1.

If a second scenario occurred where the robot 410 was kidnapped to the position illustrated in FIG. 4, the technique 300 may be used for relocalization. Milestones 406A-N are ranked according to their connectivity values and historical usage data. For example, in the example illustrated in FIG. 4, milestone 406A may be ranked higher than milestone 406E because milestone 406A has a connectivity value of 5 and milestone 406E has a connectivity value of 4. However, if milestone 406E is used more often in path planning or has been traversed by the robot more often in a given period, then milestone 406E may be ranked higher than milestone 406A. The ranked milestones are considered in batches based on their rank (e.g., if the batch size is 10, then the first 10 are considered together, then the next 10 in the ranked list, etc.). Particle clouds are generated around the milestones being considered and the MCL is used. If no solution is found, then the next batch of ranked milestones are searched and the number of particles are changed using Equation 2.

FIG. 5 is a flowchart illustrating a technique 500 for relocalization, according to an example. The technique 500 may be performed by a device including processing circuitry and memory. In an example, the processing circuitry and memory are part of a command device in communication with each of a set of robots. In another example, the processing circuitry is integrated with or connected to the robot. The memory may include instructions, to be executed by the processing circuitry. The instructions may include operations to control actions of the set of robots to relocate themselves or achieve a task without use of the command device.

The technique 500 includes an operation 502 to determine a cause of a loss of pose. Loss of pose may be due to a malfunction of one or more components of the robot or because of a different cause, such as by movement due to an external force (e.g., a person picking up and placing the robot in a new location).

The technique 500 includes an operation 504 to use a nearest neighbor process to select a set of milestones from a roadmap when the cause of the loss of pose is due to a malfunction, or use a ranking process to select the set of milestones from the roadmap when the cause of the loss of pose is not due to the malfunction, the roadmap including a plurality of milestones. In an example, the roadmap is a probabilistic roadmap. In another example, the roadmap is a deterministic roadmap.

In an example, to use the nearest neighbor process, the technique 500 includes operations to determine a last known location of the robot in the roadmap and implement the nearest neighbor process using the last known location to select the set of milestones. In a further example, the technique 500 includes operations to modify the set of milestones when localization fails to relocalize the robot by increasing a radius parameter of the nearest neighbor process.

In an example, to use the ranking process, the technique 500 includes operations to rank the plurality of milestones to produce a ranked list of milestones. In a further example, to rank the plurality of milestones the instructions, the technique 500 includes operations to rank the plurality of milestones based on a connectivity value. In a further example, the connectivity value of a milestone is a number of connections from other milestones to the milestone. In a related example, to rank the plurality of milestones, the technique 500 includes operations to rank the plurality of milestones based on a usage history. In a further example, the usage history includes a number of times that a milestone has been traversed by the robot.

In an example, the ranked list of milestones are grouped into batches, and to adjust the set of milestones, the technique 500 includes operations to select a next batch of milestones from the plurality of milestones to be the set of milestones.

The technique 500 includes an operation 506 to generate particle clouds around each milestone in the set of milestones.

The technique 500 includes an operation 508 to perform localization on each milestone in the set of milestones to attempt to relocalize the robot. In an example, to perform localization on each milestone, the technique 500 includes operations to implement a Monte Carlo Localization.

In an example, the technique 500 includes operations to navigate the robot using the relocalization.

In further examples, any of the compute nodes or devices discussed with reference to the present computing systems and environment may be fulfilled based on the components depicted in FIGS. 6A and 6B. Respective edge compute nodes may be embodied as a type of robot, drone, device, appliance, computer, or other "thing" capable of communicating with other edge, networking, or endpoint components. For example, an edge compute device may be embodied as a robot, drone, personal computer, server, smartphone, a mobile compute device, a smart appliance, an in-vehicle compute system (e.g., a navigation system), a self-contained device having an outer case, shell, etc., or other device or system capable of performing the described functions.

Figure 6A:
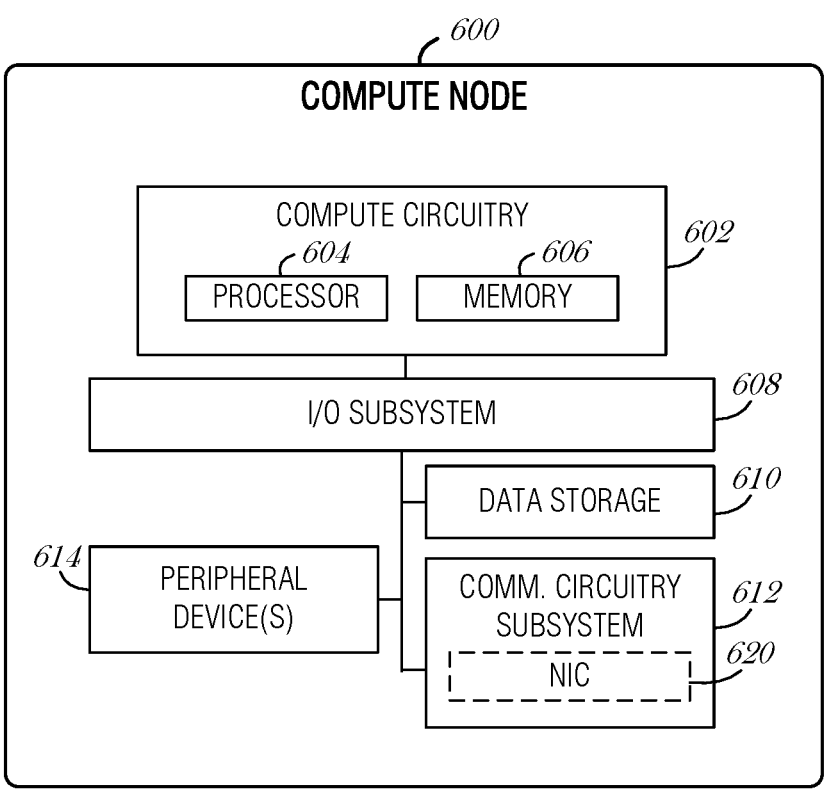
FIG. 6A provides an overview of example components for compute deployed at a compute node.

In the simplified example depicted in FIG. 6A, an edge compute node 600 includes a compute engine (also referred to herein as "compute circuitry") 602, an input/output (I/O) subsystem 608, data storage 610, a communication circuitry subsystem 612, and, optionally, one or more peripheral devices 614. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 and a memory 606. The processor 604 may be embodied as any type of processor capable of performing the functions described herein (e.g., executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 604 may work in coordination with each other to execute many types of operations and instructions within and on behalf of the compute node 600.

The memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 606 may be integrated into the processor 604. The memory 606 may store various software and data used during operation such as one or more applications, data operated on by the application(s), libraries, and drivers.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the memory 606, and other components of the compute circuitry 602, into the compute circuitry 602.

The one or more illustrative data storage devices 610 may be embodied as any type of devices configured for short-term or long-term storage of data such as, for example, memory devices and circuits, memory cards, hard disk drives, solid-state drives, or other data storage devices. Individual data storage devices 610 may include a system partition that stores data and firmware code for the data storage device 610. Individual data storage devices 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway of an implementing edge computing system). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally, or alternatively, in such examples, the local memory of the NIC 620 may be integrated into one or more components of the client compute node at the board level, socket level, chip level, or other levels.

Additionally, in some examples, a respective compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node (whether a client, gateway, or aggregation node) in an edge computing system or like forms of appliances, computers, subsystems, circuitry, or other components.

Figure 6B:
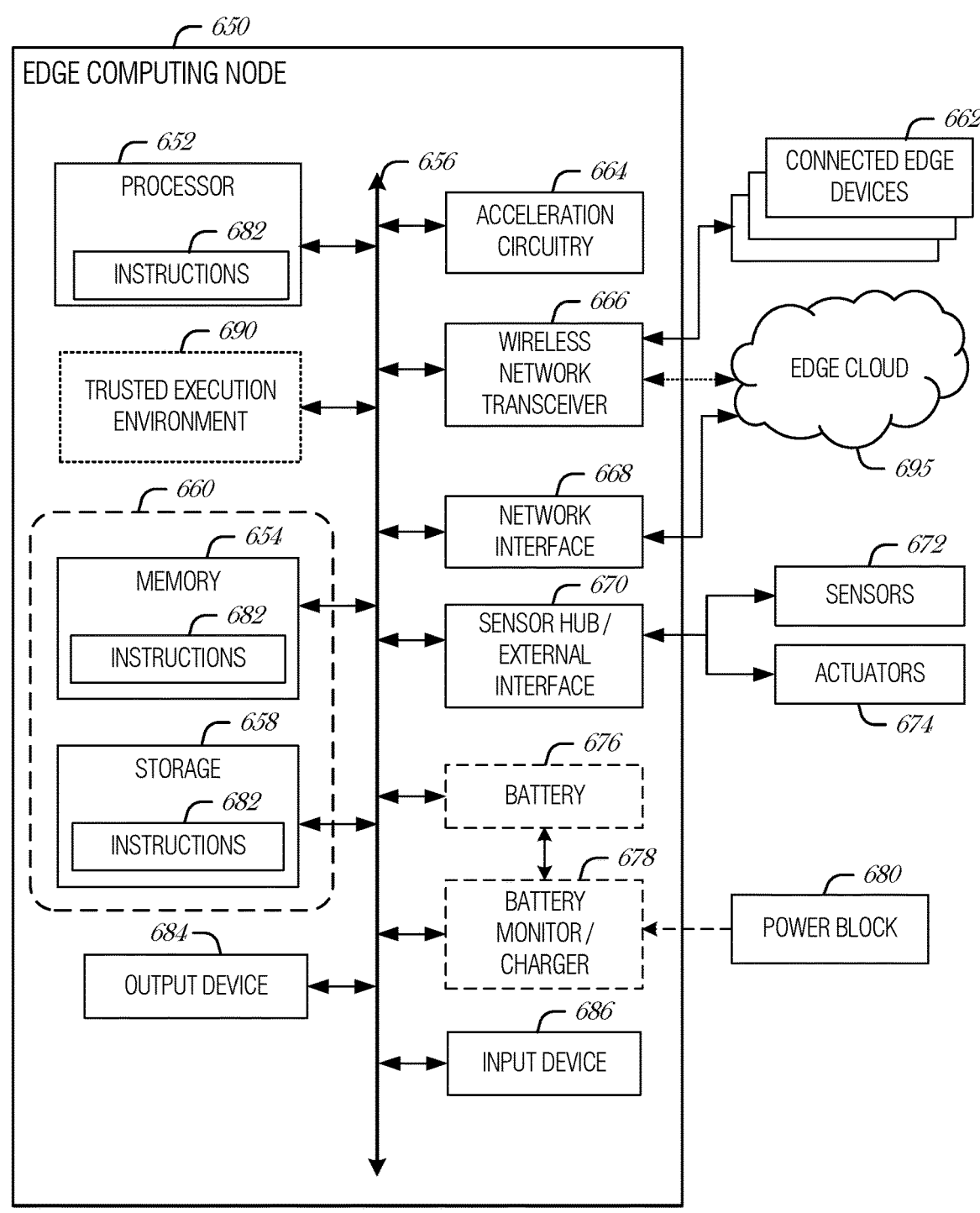
FIG. 6B provides a further overview of example components within a computing device.

In a more detailed example, FIG. 6B illustrates a block diagram of an example of components that may be present in an edge computing node 650 for implementing the techniques (e.g., operations, processes, methods, and methodologies) described herein. This edge computing node 650 provides a closer view of the respective components of node 600 when implemented as or as part of a computing device (e.g., as a mobile device, a base station, server, gateway, etc.). The edge computing node 650 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 650, or as components otherwise incorporated within a chassis of a larger system.

The edge computing device 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6B.

The processor 652 may communicate with a system memory 654 over an interconnect 656 (e.g., a bus). Any number of memory devices may be used to provide for a given amount of system memory. As examples, the memory 654 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on Bluetooth Low Energy (BLE), or another low power radio, to save power. More distant connected edge devices 662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 666 (e.g., a radio transceiver) may be included to communicate with devices or services in the edge cloud 695 via local or wide area network protocols. The wireless network transceiver 666 may be a low-power wide-area (LPWA) transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 695 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, global navigation system (e.g., GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 650. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 676 may power the edge computing node 650, although, in examples in which the edge computing node 650 is mounted in a fixed location, it may have a power supply coupled to an electrical grid, or the battery may be used as a backup or for temporary capabilities. The battery

676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676, if included. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as optical disks, flash drives, or any number of other hardware devices. The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 682 on the processor 652 (separately, or in combination with the instructions 682 of the machine readable medium 660) may configure execution or operation of a trusted execution environment (TEE) 690. In an example, the TEE 690 operates as a protected area accessible to the processor 652 for secure execution of instructions and secure access to data. Various implementations of the TEE 690, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device examples include the following, non-limiting implementations. Each of the following non-limiting examples may stand on its own or may be combined in any permutation or combination with any one or more of the other examples provided below or throughout the present disclosure.

ADDITIONAL NOTES & EXAMPLES

Example 1 is a system for robotic navigation for a robot, the system comprising: processing circuitry; and memory, including instructions for performing relocalization, which when executed by the processing circuitry, cause the processing circuitry to perform operations to: determine a cause of a loss of pose; use a nearest neighbor process to select a set of milestones from a roadmap when the cause of the loss of pose is due to a malfunction, or use a ranking process to select the set of milestones from the roadmap when the cause of the loss of pose is not due to the malfunction, the roadmap including a plurality of milestones; generate particle clouds around each milestone in the set of milestones; and perform localization on each milestone in the set of milestones to attempt to relocalize the robot.

In Example 2, the subject matter of Example 1 includes, wherein to use the nearest neighbor process, the instructions further include operations to: determine a last known location of the robot in the roadmap; and implement the nearest neighbor process using the last known location to select the set of milestones.

In Example 3, the subject matter of Example 2 includes, wherein the instructions further include operations to: modify the set of milestones when localization fails to relocalize the robot by increasing a radius parameter of the nearest neighbor process.

In Example 4, the subject matter of Examples 1-3 includes, wherein to use the ranking process, the instructions further include operations to: rank the plurality of milestones to produce a ranked list of milestones.

In Example 5, the subject matter of Example 4 includes, wherein to rank the plurality of milestones the instructions further include operations to rank the plurality of milestones based on a connectivity value.

In Example 6, the subject matter of Example 5 includes, wherein the connectivity value of a milestone is a number of connections from other milestones to the milestone.

In Example 7, the subject matter of Examples 5-6 includes, wherein to rank the plurality of milestones the instructions further include operations to rank the plurality of milestones based on a usage history.

In Example 8, the subject matter of Example 7 includes, wherein the usage history includes a number of times that a milestone has been traversed by the robot.

In Example 9, the subject matter of Examples 4-8 includes, wherein the ranked list of milestones are grouped into batches, and wherein to adjust the set of milestones the instructions further include operations to select a next batch of milestones from the plurality of milestones to be the set of milestones.

In Example 10, the subject matter of Examples 1-9 includes, wherein to perform localization on each milestone, the instructions further include operations to implement a Monte Carlo Localization.

In Example 11, the subject matter of Examples 1-10 includes, wherein the instructions further include operations to: navigate the robot using the relocalization.

In Example 12, the subject matter of Examples 1-11 includes, wherein the roadmap is a probabilistic roadmap.

In Example 13, the subject matter of Examples 1-12 includes, wherein the roadmap is a deterministic roadmap.

In Example 14, the subject matter of Examples 1-13 includes, wherein the system is integrated into the robot.

In Example 15, the subject matter of Examples 1-13 includes, wherein the system comprises a remote robot controller to provide navigation support to the robot.

Example 16 is at least one non-transitory machine-readable medium including instructions for robotics relocalization, which when executed by processing circuitry, causes the processing circuitry to perform operations to: determine a cause of a loss of pose of a robot; use a nearest neighbor process to select a set of milestones from a roadmap when the cause of the loss of pose is due to a malfunction, or use a ranking process to select the set of milestones from the roadmap when the cause of the loss of pose is not due to the malfunction, the roadmap including a plurality of milestones; generate particle clouds around each milestone in the set of milestones; and perform localization on each milestone in the set of milestones to attempt to relocalize the robot.

In Example 17, the subject matter of Example 16 includes, wherein to use the nearest neighbor process, the instructions further include operations to: determine a last known location of the robot in the roadmap; and implement the nearest neighbor process using the last known location to select the set of milestones.

In Example 18, the subject matter of Example 17 includes, wherein the instructions further include operations to: modify the set of milestones when localization fails to relocalize the robot by increasing a radius parameter of the nearest neighbor process.

In Example 19, the subject matter of Examples 16-18 includes, wherein to use the ranking process, the instructions further include operations to: rank the plurality of milestones to produce a ranked list of milestones.

In Example 20, the subject matter of Example 19 includes, wherein to rank the plurality of milestones the instructions further include operations to rank the plurality of milestones based on a connectivity value.

In Example 21, the subject matter of Example 20 includes, wherein the connectivity value of a milestone is a number of connections from other milestones to the milestone.

In Example 22, the subject matter of Examples 17-19 includes, wherein the ranked list of milestones are grouped into batches, and wherein to adjust the set of milestones the instructions further include operations to select a next batch of milestones from the plurality of milestones to be the set of milestones.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for robotic navigation for a robot, the system comprising:

processing circuitry; and memory, including instructions for performing relocalization, which when executed by the processing circuitry, cause the processing circuitry to perform operations to:

determine a cause of a loss of pose;

use, depending on the cause of the loss of pose, either a) a nearest neighbor process to select a set of milestones from a roadmap when the cause of the loss of pose is due to a malfunction, or b) a ranking process to select the set of milestones from the roadmap when the cause of the loss of pose is not due to the malfunction, the roadmap including a plurality of milestones;

generate particle clouds around each milestone in the set of milestones;

perform localization on each milestone in the set of milestones to attempt to relocalize the robot; and navigate the robot using the relocalization.

2. The system of claim 1, wherein to use the nearest neighbor process, the instructions further include operations to:

determine a last known location of the robot in the roadmap; and implement the nearest neighbor process using the last known location to select the set of milestones.

3. The system of claim 2, wherein the instructions further include operations to:

modify the set of milestones when localization fails to relocalize the robot by increasing a radius parameter of the nearest neighbor process.

4. The system of claim 1, wherein to use the ranking process, the instructions further include operations to:

rank the plurality of milestones to produce a ranked list of milestones.

5. The system of claim 4, wherein to rank the plurality of milestones the instructions further include operations to rank the plurality of milestones based on a connectivity value.

6. The system of claim 5, wherein the connectivity value of a milestone is a number of connections from other milestones to the milestone.

7. The system of claim 5, wherein to rank the plurality of milestones the instructions further include operations to rank the plurality of milestones based on a usage history.

8. The system of claim 7, wherein the usage history includes a number of times that a milestone has been traversed by the robot.

9. The system of claim 4, wherein the ranked list of milestones are grouped into batches, and wherein to adjust the set of milestones the instructions further include operations to select a next batch of milestones from the plurality of milestones to be the set of milestones.

10. The system of claim 1, wherein to perform localization on each milestone, the instructions further include operations to implement a Monte Carlo Localization.

11. The system of claim 1, wherein the roadmap is a probabilistic roadmap.

12. The system of claim 1, wherein the roadmap is a deterministic roadmap.

13. The system of claim 1, wherein the system is integrated into the robot.

14. The system of claim 1, wherein the system comprises a remote robot controller to provide navigation support to the robot.

15. At least one non-transitory machine-readable medium including instructions for robotics relocalization, which when executed by processing circuitry, causes the processing circuitry to perform operations to:

determine a cause of a loss of pose of a robot;

use, depending on the cause of the loss of pose, either a) a nearest neighbor process to select a set of milestones from a roadmap when the cause of the loss of pose is due to a malfunction, or b) a ranking process to select the set of milestones from the roadmap when the cause of the loss of pose is not due to the malfunction, the roadmap including a plurality of milestones;

generate particle clouds around each milestone in the set of milestones;

perform localization on each milestone in the set of milestones to attempt to relocalize the robot; and navigate the robot using the relocalization.

16. The machine-readable medium of claim 15, wherein to use the nearest neighbor process, the instructions further include operations to:

determine a last known location of the robot in the roadmap; and implement the nearest neighbor process using the last known location to select the set of milestones.

17. The machine-readable medium of claim 16, wherein the instructions further include operations to:

modify the set of milestones when localization fails to relocalize the robot by increasing a radius parameter of the nearest neighbor process.

18. The machine-readable medium of claim 15, wherein to use the ranking process, the instructions further include operations to:

rank the plurality of milestones to produce a ranked list of milestones.

19. The machine-readable medium of claim 18, wherein to rank the plurality of milestones the instructions further include operations to rank the plurality of milestones based on a connectivity value.

* * * * *